United States Patent [19]

Iijima et al.

[11] Patent Number: 4,990,389

[45] Date of Patent: Feb. 5, 1991

[54] DISK FOR MAGNETIC RECORDING

[75] Inventors: Kensaburou Iijima; Kazuyuki Asano, both of Hamamatsu, Japan

[73] Assignee: Nippon Gakki Seizo Kabushiki Kaisha, Japan

[21] Appl. No.: 215,209

[22] Filed: Jul. 5, 1988

Related U.S. Application Data

[63] Continuation of Ser. No. 81,661, Aug. 4, 1987, abandoned, which is a continuation of Ser. No. 786,651, Oct. 11, 1985, abandoned.

[30] Foreign Application Priority Data

Oct. 12, 1984 [JP] Japan .............................. 59-213833
Oct. 12, 1984 [JP] Japan .............................. 59-213834

[51] Int. Cl.$^5$ .............................................. G11B 23/00
[52] U.S. Cl. ..................................... 428/64; 428/216; 428/332; 428/611; 428/694; 428/900

[58] Field of Search ............... 428/611, 678, 680, 686, 428/216, 694, 900, 332

[56] References Cited

U.S. PATENT DOCUMENTS

| | | | |
|---|---|---|---|
| 4,245,008 | 1/1981 | Michaelson et al. | 428/678 |
| 4,426,265 | 1/1984 | Brunsch et al. | 428/900 |
| 4,636,448 | 1/1987 | Morita et al. | 428/611 |
| 4,707,417 | 11/1987 | Hayakawa et al. | 428/611 |
| 4,731,300 | 3/1988 | Watanabe et al. | 428/611 |

Primary Examiner—Paul J. Thibodeau
Attorney, Agent, or Firm—Ostrolenk, Faber, Gerb & Soffen

[57] ABSTRACT

A disk for magnetic recording, including a thin Fe-Cr-Co magnetic wafer for signal recording and a rigid substrate reduces the development of large warps and enlarges the output signals, thereby significantly reducing read-out errors.

4 Claims, 1 Drawing Sheet

DISK FOR MAGNETIC RECORDING

This is a continuation of application Ser. No. 81,661, filed Aug. 4, 1987, now abandoned which is a continuation of application Ser. No. 786,651, filed Oct. 11, 1985 now abadoned.

BACKGROUND OF THE INVENTION

The present invention relates to an improved disk for magnetic recording, and more particularly relates to an improvement in composition of a disk used for magnetic rotary encoders.

Among various rotary encoder used as indispensable sensors for servo-control systems, a magnetic rotary encoders is well known in which signals magnetically recorded on the peripheral fringe of a disk made of magnetic material are read out by a magnetic sensor for detection of amount of rotation of a motor or the like.

Fe-Cr-Co alloys have conventionally been used for such disks because of their hardness and high magnetic property and excellent workability. Due to increasing demand in market for higher resolving power, larger diameter constructions have been recently employed. This has made it necessary to use thinner disks in order to minimize the increase in inertia during rotation of the disk which would otherwise result from the increased diameter of the disks.

The trend to larger and thinner disks tend to result in warping of the disk both because the material for the disk has an inherent tendency to warp and because of grinding operations which take place during production of the disk. The presence of such warps causes variations in the gap between the disk and an associated magnetic sensor as the disk rotates for read-out, thereby significantly enlarging read-out errors.

For example, in the case of a disk for a rotary encoder whose periphery or peripheral fringe is magnetized for formation of a magnetic calibration (magnetic signals) at a pitch of 30 to 100 $\mu$m, the degree of warping has to be minimized to 5 $\mu$m or less when a magnetic sensor is 2 to 10 $\mu$m from the face of magnetization on the disk. When the degree of warping exceeds this limit, the resultant variation in the gap unavoidably produces read-out errors in the form of changes in the output voltage.

SUMMARY OF THE INVENTION

It is a object of the present invention to of limit the development of warps on a disk to an extent which will avoid the production of read-out errors, and to obtain an output voltage of sufficient magnitude.

In accordance with the basic concept of the present invention, at least one face of a substrate is covered with a thin magnetic wafer bonded thereto which is made of Fe-Cr-Co magnetic material.

DESCRIPTION OF THE PREFERRED EMBODIMENT

Figure 1:
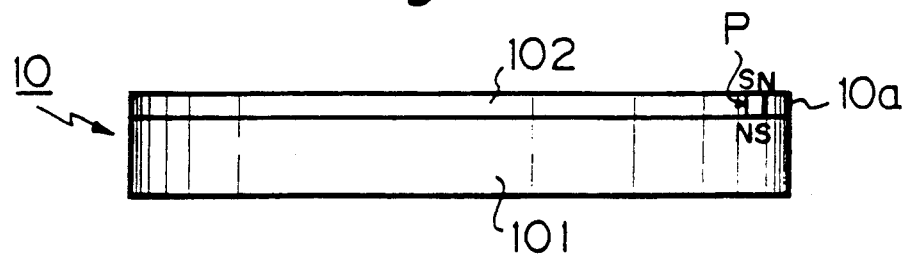
FIG. 1 is a side view of one embodiment of the disk in accordance with the present invention.
Figure 2:
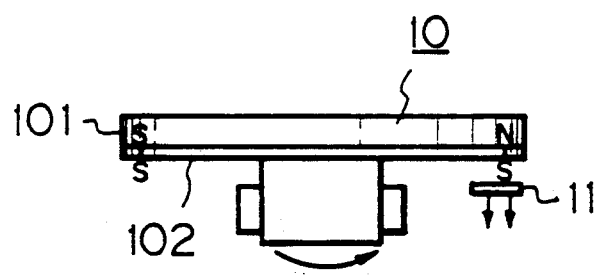
FIG. 2 is a side view of the disk shown in FIG. 1 in use.
Figure 3:
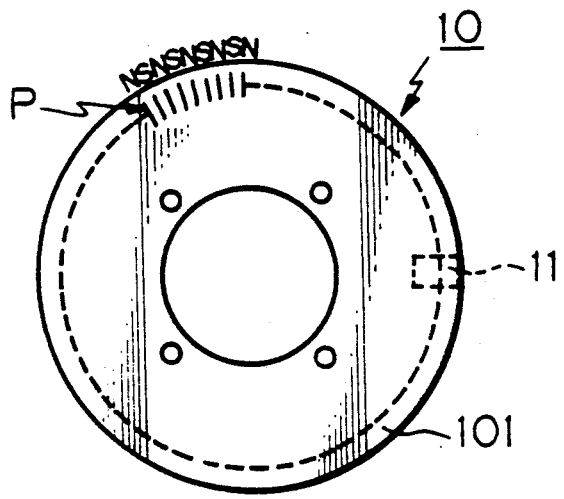
FIG. 3 is a plan view of the disk shown in FIG. 2.

One embodiment of the disk in accordance with the present invention is shown in FIGS. 1 to 3, the disk being used for rotary encoders. In order to read out magnetic signals P recorded on the peripheral fringe 10a of the disk 10, a magnetic sensor 11, such as a magnetic resistance element is provided. The disk 10 is made up of a substrate 101 and a magnetic wafer or plate 102 bonded to one surface of the substrate 101. The magnetic wafer 102 is thinner than the substrate 101 and is made of Fe-Cr-Co magnetic material. The magnetic signals P are recorded at a pitch of 30 to 100 $\mu$m with different poles of the magnetic signals P appearing alternately on the face of the disk 10.

The thickness of the substrate 101 should preferably be in a range from 0.5 to 10 mm and that of the magnetic wafer 102 in a range from 5 $\mu$m to 1.0 mm.

The substrate 101 is made of a high magnetic permeability material containing Fe or Fe-Ni as a major component. One example of the Fe predominant high magnetic permeability material contains 0.02% by weight or less of C, 0.05% by weight or less of Si, 0.05% by weight or less of Mn, 0.03% by weight or less of P, 0.03% by weight or less of S, and the Fe balance being.

The Fe-Cr-Co magnetic material used for the magnetic wafer 102 should preferably contain 15 to 45 wt % of Cr, 10 to 15 wt % of Co and Fe in balance. It may contain other substances also.

To produce the disk 10, a plate of high magnetic material is press stamped and subjected to rough grinding and abrasion in order to obtain a substrate 101 exhibiting warps smaller than 5 $\mu$m. A magnetic wafer 102 is attached to one face of substrate 101 by a bond such as epoxy resin and the exposed face of the magnetic wafer 102 is subjected to light abrasion.

Despite the thin construction of the magnetic wafer 102, the total rigidity of the disk 10 is sufficiently high due to presence of the rigid substrate 101 and the small size of warps on the substrate 101 does not develop any warps on the magnetic wafer 102 when the latter is subjected to the final abrasion. Thus, use of the disk 10 so produced assures significantly decreased variations in gap size between the magnetic sensor 11 and the magnetic wafer 102 on the disk 10, thereby enabling accurate read-out of the disk.

When a thin magnetic wafer which is not coupled to a substrate is magnetized at a pitch of 100 $\mu$m, no significant distance ratio is obtained. But when the wafer is coupled to the substrate, the distance ratio is doubled and, as a consequence, the surface magnetic flux density of the magnetic signals P on the disk is almost equal to that of conventional disks. Thus an output voltage of sufficient magnitude can be obtained. Here, the term "distance ratio" refers to a ratio of the distance between N and S poles appearing on opposite faces of a magnetic wafer with respect to the distance between adjacent magnetic signals recorded on the magnetic wafer. The lower limit of the latter is fixed by the resolving power of the magnetic sensor used for read-out. In the case of Fe-Cr-Co magnetic material, the distance ratio should preferably be 5 or larger. In order to obtain such a large distance ratio, the distance between N and S poles must be enlarged. From this point of view, the lower limit for the thickness of the disk is fixed. Whereas the upper limit for the thickness of the disk is fixed as a function of what is the tolerable rotation inertia.

Fe-Cr-Co magnetic material is advantageously used for the magnetic wafer of the present invention since its sufficiently high residual magnetic flux density brings about large distance ratio when combined in one body with the substrate.

We claim:

1. An improved disk for magnetic recording, comprising:
   a support substrate; and
   at least one magnetic wafer, thinner than said substrate, bonded to at least one face of said substrate and made of Fe-Cr-Co magnetic material, said Fe-Cr-Co magnetic material containing 15 to 45 % by weight of Cr, 10 to 15% by weight of Co and Fe substantially in balance;
   wherein said support substrate consists essentially of a high magnetic permeability material, said support substrate being of sufficient thickness to mechanically support said magnetic wafer by itself, the thickness of said substrate being in a range from 0.5 to 10 mm.

2. An improved disk as claimed in claim 1, in which the thickness of said magnetic wafer is in a range from 5 $\mu$m to 1.0 mm.

3. An improved disk as claimed in claim 1, wherein said substrate is an alloy containing Fe as a major alloy component.

4. An improved disk as claimed in claim 1, wherein said substrate is an alloy containing Fe-Ni as a major alloy component.

* * * * *